J. MARMORSTEIN.
PIPE PATCH.
APPLICATION FILED OCT. 17, 1912.
1,073,505.  Patented Sept. 16, 1913.
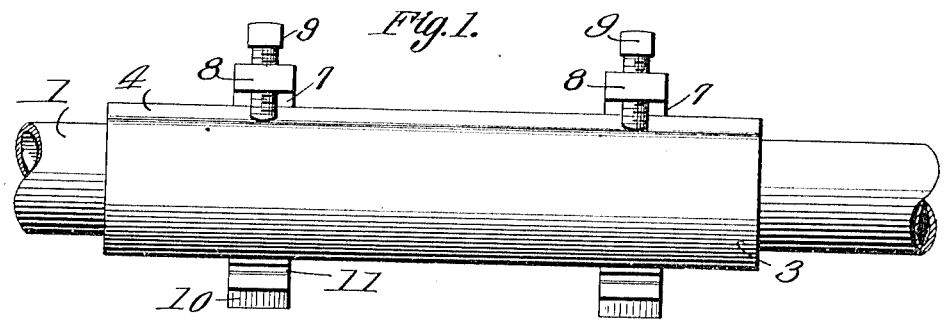
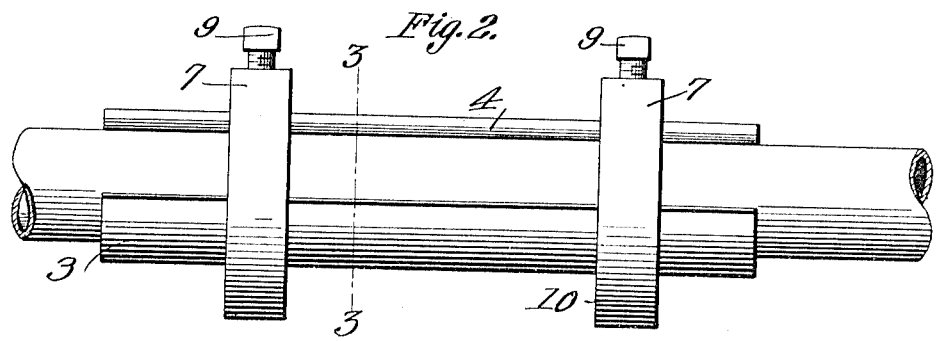
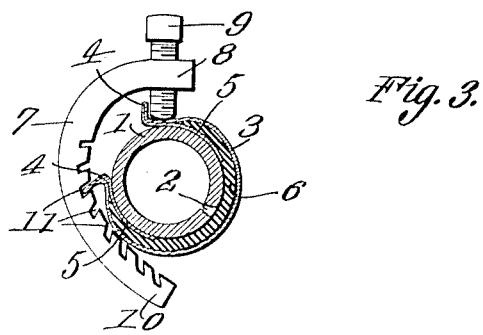
Witnesses
J. M. Fowler Jr.
W. H. Wakefield
Inventor
John Marmorstein
By Mason Fenwick & Lawrence
Attorneys

UNITED STATES PATENT OFFICE.

JOHN MARMORSTEIN, OF JERSEY CITY, NEW JERSEY.

PIPE-PATCH.

1,073,505.　　　　Specification of Letters Patent.　　Patented Sept. 16, 1913.

Application filed October 17, 1912. Serial No. 726,314.

*To all whom it may concern:*

Be it known that I, JOHN MARMORSTEIN, a citizen of the United States, residing at Jersey City, in the county of Hudson and State of New Jersey, have invented certain new and useful Improvements in Pipe-Patches; and I do hereby declare the following to be a full, clear, and exact description of the invention, such as will enable others skilled in the art to which it appertains to make and use the same.

This invention relates to devices for quickly mending breaks in rubber hose, water and gas pipes, and has as an object to provide a device of this class which will be useful upon a variety of sizes of pipes.

Another object of the invention is to provide a device of this class of such construction that the pressure applied thereto will be concentrated at the leak.

With these and other objects in view the invention comprises certain novel constructions, combinations, and arrangements of parts as will be hereinafter more fully described and claimed.

In the drawings: Figure 1 is a front elevation of a section of pipe with the invention applied thereto. Fig. 2 is a rear elevation similar to Fig. 1. Fig. 3 is a vertical transverse section taken upon line 3—3 of Fig. 2.

Like reference characters designate corresponding parts in the drawings.

Heretofore the styles of devices used for stopping leaks in rubber hose, water and gas pipes have generally comprised a rigid member associated with a flexible member in such a way that the whole device could only be used on one or two sizes of pipe. To overcome this objection, I have provided a device which consists substantially of a flanged, flexible member lined internally with a soft material and an adjustable means for bridging the flanges of the flexible member for securing the same to the pipe.

In the drawings, 1 represents a section of a pipe having a fault therein, such fault being produced by freezing or any other accidental cause, the fault being designated conventionally at 2. The flexible member which it is desired to place over this fault 2 comprises a flexible metallic strip 3 preferably of galvanized sheet iron which is bent back upon itself to provide outwardly extending flanges 4, the inner ends of strip 3 extending within the flexible member, as indicated at 5. Held to the strip 3 by means of the inwardly extending ends 5 is a strip 6 of soft material, such as soft rubber or lead. If desired the length of the inwardly extending ends 5 can be so adjusted that the exposed surface of strip 6 shall be less than half the internal surface of the entire flexible member. By this construction it is found that the metal ends 5 will slide over the plate 1 when pressure is applied to the flanges 4, and the compression applied more directly to the exposed surface 6, the fault 2 being more completely closed by this construction than if the rubber 6 were to extend throughout the greater part of the interior of the flexible member. Shown generally at 7 is a curved clasp, the purpose of which is to bind the ends of the flexible member together. In one end 8 of this member is mounted a square headed screw 9 which is designed to be caught under one of the flanges 4, while the end 10 is provided with a plurality of serrations 11 which are adapted to receive a second flange 4. If desired, the flange 7 may be given the form shown in Fig. 3, where it will be seen that the end 8 has a greater curvature than the end 10, the outline of the member 7 in this case being virtually a spiral. The reason for this construction is that when it is desired to fit the device to a larger pipe than that shown in Fig. 3, the comparatively flat end 10 will always be substantially tangential to the pipe. It will be noted that serrations 11 are at such an angle to the face of the clasp 7 that the flange 4 will always be held tightly against the pipe.

When applying this device to a pipe, the flexible member opposite the strips 3 and 6 is first slipped around the pipe in such a way that the center of the exposed face of the strip 6 will be just opposite the fault. The square headed screw 9 is then withdrawn until just enough projects inwardly from the end 8 to engage one of the flanges 4, after which the opposite side of the strip 3 is pressed inwardly as far as possible with the fingers and the remaining flange 4 is caught in the nearest serration 11. The screw 9 is then tightened and strip 6 bound tightly upon the pipe around the fault 2. It is found that by tapping with a stick of wood that part of the strip 3 adjacent the fault, strip 6 is driven into closer contact with the pipe.

Because of the preferred construction whereby the ends 5 extend around the greater part of the pipe, practically all of the pressure will be exerted between the exposed portion of strip 6 and the pipe adjacent the fault. Of course the screw 9 could be replaced by any other suitable means, such as a thumb screw, but the reason for showing the same with a square head is that the same may be operated in a very small space.

It will be obvious from the construction that strip 7 could be used with a number of sizes of pipe, and also that strip 7 could be used with several sizes of flexible members 3. Also, if the leak or fault be a long one, member 3 could be made of corresponding length and several clasps 7 used. Obviously, if the break be very small, a single clasp 7 could be used with a short strip 3.

What I claim is:

1. In a pipe patching device, the combination with an open sleeve having outwardly extending marginal flanges disposed along its longitudinal edges, of an arcuate clasp separate from the sleeve having notches formed in its inner face for engagement with one of said flanges, and a tensioning means carried by said clasp for engagement with the other of said flanges.

2. In a pipe patching device, the combination with an open sleeve formed from sheet metal and having its marginal, longitudinal edges turned under to form pockets, of a gasket disposed against the inner face of said sheet and having its longitudinal edges seated within said pockets, the bent-over portions of said sheet being bent to form outwardly extending longitudinal flanges, and tensioning means engageable with said flanges.

3. In a pipe patching device, a longitudinal split tube formed from sheet metal having its longitudinal edges bent outwardly and thence against the inner face to respectively form outwardly extending longitudinal flanges and gasket-receiving pockets.

In testimony whereof I affix my signature in presence of two witnesses.

JOHN MARMORSTEIN.

Witnesses:
SIGMUND MARMORSTEIN,
PATTY TRONCO.

Copies of this patent may be obtained for five cents each, by addressing the "Commissioner of Patents, Washington, D. C."